(12) United States Patent
Ginn et al.

(10) Patent No.: US 8,453,457 B2
(45) Date of Patent: Jun. 4, 2013

(54) NOZZLE PLASMA FLOW CONTROL UTILIZING DIELECTRIC BARRIER DISCHARGE PLASMA ACTUATORS

(75) Inventors: Kerry B. Ginn, Weatherford, TX (US);
Stewart A. Jenkins, Keller, TX (US);
David M. Wells, Fort Worth, TX (US);
Brent N. McCallum, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 952 days.

(21) Appl. No.: 12/547,635

(22) Filed: Aug. 26, 2009

(65) Prior Publication Data
US 2011/0048025 A1 Mar. 3, 2011

(51) Int. Cl.
*F02K 1/46* (2006.01)
(52) U.S. Cl.
USPC ............... 60/770; 60/204; 60/226.1; 60/230; 60/39.5; 239/265.19; 313/234; 313/607
(58) Field of Classification Search
USPC ... 60/204, 226.1, 230, 770, 39.5; 239/265.19; 313/234, 607
See application file for complete search history.

(56) References Cited

U.S. PATENT DOCUMENTS

| | | | |
|---|---|---|---|
| 5,752,381 A * | 5/1998 | Speller | 60/228 |
| 5,966,452 A | 10/1999 | Norris | |
| 6,570,333 B1 | 5/2003 | Miller et al. | |
| 6,796,532 B2 | 9/2004 | Malmuth et al. | |
| 6,805,325 B1 | 10/2004 | Malmuth et al. | |
| 7,183,515 B2 | 2/2007 | Miller et al. | |
| 7,255,062 B1 | 8/2007 | Higman | |
| 7,334,394 B2 | 2/2008 | Samimy et al. | |
| 7,380,756 B1 * | 6/2008 | Enloe et al. | 244/175 |
| 2007/0241229 A1 | 10/2007 | Silkey et al. | |
| 2008/0067283 A1 | 3/2008 | Thomas | |
| 2008/0115477 A1 | 5/2008 | Samimy et al. | |

OTHER PUBLICATIONS

James Bridges, Mark Wernet, and Cliff Brown, Control of Jet Noise Through Mixing Enhancement, NASA/TM—2003-21235, Jun. 2003, Prepared for the Noise-Con 2003 sponsored by the Institute of Noise Control Engineering of the USA (INCE-USA), Cleveland, Ohio, Jun. 23-25, 2003.

Michael Bolitho and Jamey D. Jacob, Thrust Vectoring Flow Control Using Plasma Synthetic Jet Actuators, AIAA 2008-1429, 46th AIAA Aerospace Sciences Meeting and Exhibit, Jan. 7-10, 2008, Reno Nevada, Copyright © 2008 by the American Institute of Aeronautics and Astronautics, Inc.

* cited by examiner

*Primary Examiner* — Phutthiwat Wongwian
*Assistant Examiner* — Steven Sutherland
(74) *Attorney, Agent, or Firm* — Bracewell & Giuliani LLP

(57) ABSTRACT

Dielectric barrier discharge plasma actuators are used to manipulate exhaust flow within and behind a jet engine nozzle. The dielectric barrier discharge plasma actuators may be used to direct cooling airflow near the surface of the nozzle to reduce heating of the nozzle, create thrust vectoring, and reduce noise associated with the exhaust flow exiting the nozzle.

20 Claims, 5 Drawing Sheets

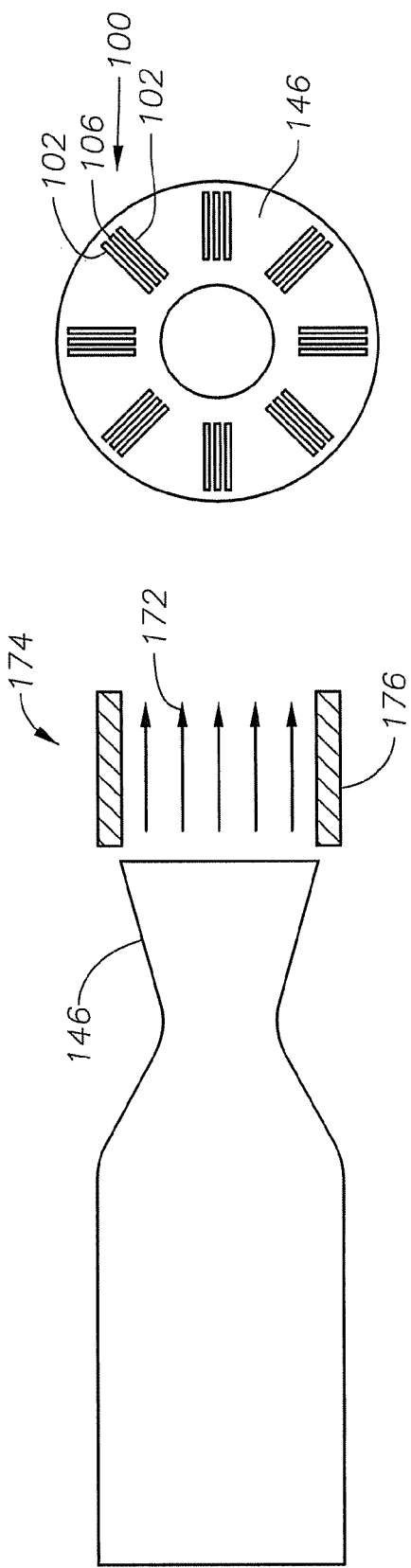
Fig. 11
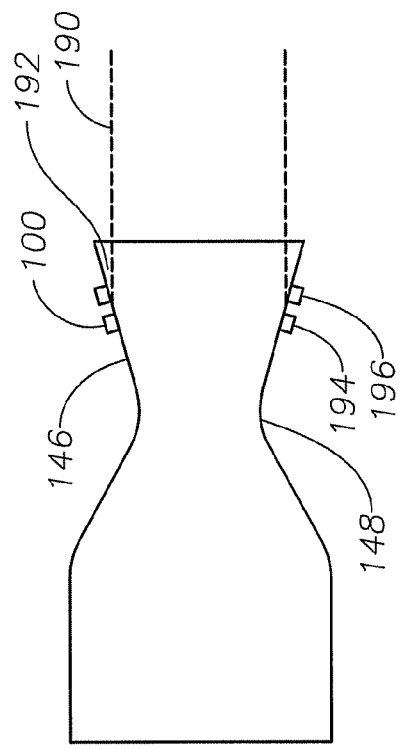
Fig. 12
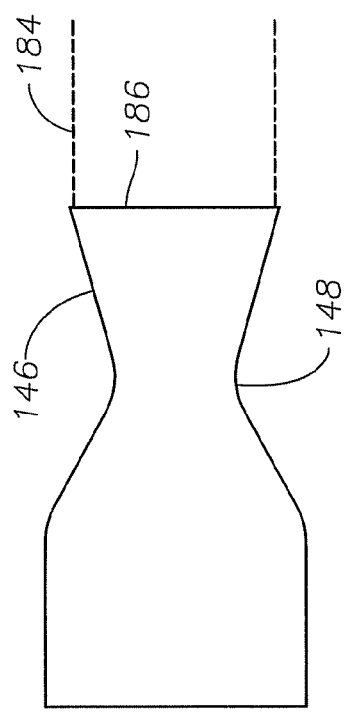
Fig. 13
Fig. 14

NOZZLE PLASMA FLOW CONTROL UTILIZING DIELECTRIC BARRIER DISCHARGE PLASMA ACTUATORS

BACKGROUND

1. Technical Field

This disclosure relates in general to using plasma actuators to manipulate jet exhaust flow. This disclosure relates in particular to using dielectric barrier discharge plasma actuators on the surface of jet nozzles to improve nozzle thermal environment, reduce acoustic noise and increase propulsion system performance.

2. Description of Related Art

Jet engine exhaust nozzles must withstand severe thermal and acoustic effects. High temperatures and thermal gradients in the exhaust system reduce durability of nozzle materials and structures. High velocity exhaust flows, especially in the presence of dynamic flow separation and reattachment, result in severe jet noise. This can be an issue from the ground environment point of view (takeoff noise regulations, ground crew safety, etc) as well as having aircraft structural/acoustic implications. Thermal issues have traditionally been addressed by mixing cooler flow with hot flow or by introducing a film of cooling air along the surface to be cooled. However, the propulsion system performance penalty associated with the large amount of cooling air which may be necessary can have an adverse impact on vehicle performance. Noise reduction approaches have also included mixing cooler air with hot engine exhaust as well as the use of tabs, lobes, or deformable geometry to promote mixing. These approaches can also introduce performance penalties as well as weight and complexity. A means of manipulating the exhaust system flow field to alleviate thermal and acoustic concerns with lower performance penalties, weight and complexity than traditional approaches is needed.

Some development has considered localized arc filament plasma to manipulate exhaust flowfields for noise reduction. Arc filament plasma produces an electric arc between two electrodes, which produces rapid local heating of flow in the vicinity of the arc. This produces a rapid pressure rise and a shock wave which propagates radially from the arc into the surrounding flow. Arc filament plasma may complicate exhaust system cooling because of the large amount of heat generated by the arc.

Nozzles for high performance aircraft typically operate off-design at takeoff and low speed conditions, thus incurring decreased efficiency. Elimination of this performance penalty with current approaches would require the use of increased variable geometry. But this would incur additional complexity and weight. A more efficient means of reducing nozzle off-design performance penalties is needed.

Thrust vectoring exhaust systems offer improved vehicle survivability, maneuverability and the opportunity to reduce the size of air vehicle aerodynamic control surfaces. Mechanical vectoring nozzle systems, however, incur increased complexity and weight which can adversely impact vehicle performance. Fluidic vectoring exhaust systems provide thrust vectoring with less complexity and lighter weight, but may result in reduced non-vectoring thrust performance. Conventional fluidic vectoring systems require a supply of high pressure gas from the engine or some other source. This can result in vehicle propulsion system performance penalties. The injection orifices in nozzle surfaces also pose challenges from a survivability, producibility, and maintainability perspective. A means of manipulating exhaust system flowfields to vector engine thrust is needed which is mechanically simple, durable, light weight, and imposes less penalty on propulsion system and vehicle performance.

SUMMARY OF THE INVENTION

Dielectric barrier discharge ("DBD") plasma actuators are located on one or more surfaces within a jet engine exhaust nozzle. The DBD plasma is used to manipulate fluid flow near the surface of a jet engine nozzle.

An exemplary embodiment of the invention employs DBD plasma as an actuation mechanism for flow control (plasma flow control) to manipulate the exhaust system flowfield. The manipulated flowfields can reduce wall temperatures and thermal gradients, reduce acoustic effects, improve nozzle thrust efficiency, and improve thrust vector control. Plasma flow control works through application of high voltage across suitably arranged electrodes to ionize air (or exhaust gas) molecules which then travel from one electrode toward the other. Momentum is transferred from these ions to other air molecules through collisions resulting in local flow acceleration. In regions of high receptivity, this can produce a deflection of flow or induce or prevent flow separation.

Exhaust system surfaces are often cooled by introduction of a layer of cooling air near the surface. This film gradually mixes with hot air or is swept off the surface by secondary flows (non-axial flow due to swirl, vortices, etc), requiring introduction of another layer of cooling air. Plasma flow control may be used to reduce undesirable secondary flows or to control the behavior of air in a cooling film so that the film remains intact and effective over a greater distance. Thermal gradients may be alleviated by the ability to control the distribution of cooling air as well. This ability to manipulate the behavior of the flow near the nozzle surface may result in reduced cooling flow requirements and therefore reduced engine performance penalty. The plasma flow control system may be actively controlled to provide enhanced cooling effectiveness at operating conditions when it is needed and can be "turned off" at more benign operating conditions.

Plasma flow control may be used to change the location of flow separation in a nozzle divergent section by manipulation of flow near the nozzle wall. This can help to spatially and temporally manipulate the exhaust system flowfield to reduce noise and structural acoustic loads. Also, plasma flow control can be used to establish vortices near the nozzle exit to enhance mixing between the plume and freestream flow to reduce jet noise. Since plasma flow actuators can be operated over a wide frequency range, their frequency may be varied to produce optimal noise reduction over a range of operating conditions.

Nozzle thrust efficiency of convergent-divergent nozzles is adversely impacted when the nozzle flow is expanded to pressures lower than local ambient ("off-design" conditions). This often occurs at takeoff or low speed operation of aircraft with high speed capability (and therefore high expansion area ratio nozzles) or fixed geometry nozzles. Plasma flow control may be used to tailor the location of flow separation inside the nozzle so that the effective expansion area ratio is changed to provide more optimum flow expansion, thus increasing thrust efficiency.

Plasma flow control may be used to achieve thrust vectoring by inducing nozzle flow to separate from one side of a nozzle divergent section while remaining attached to the other side. Also, if enough flow acceleration can be induced, the exhaust stream can be deflected either directly or though establishment of vortices in order to deflect the exhaust flow.

BRIEF DESCRIPTION OF THE DRAWINGS

FIG. 11 is a side view of a convergent-divergent jet engine nozzle.

FIG. 12 is an end view of an exemplary embodiment of plasma electrodes located near the exit of the convergent-divergent nozzle of FIG. 11.

FIG. 13 is a side view of an exhaust plume from a jet engine nozzle at ideally expanded conditions.

FIG. 14 is a side view of an exemplary embodiment of plasma flow control causing early separation of an exhaust plume from a jet engine nozzle at overexpanded conditions.

DETAILED DESCRIPTION

Figure 1:
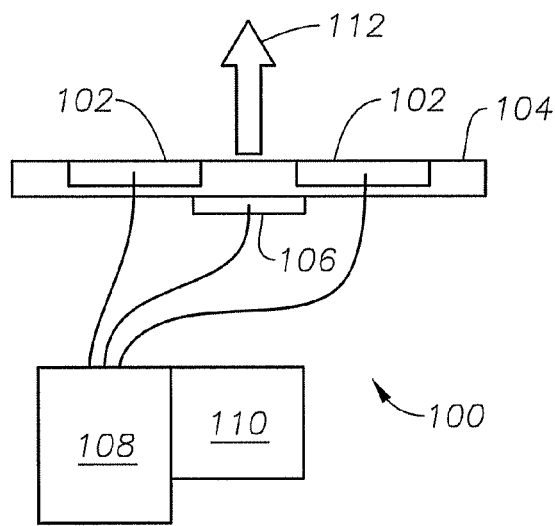
FIG. 1 is a block diagram of an exemplary embodiment of a dielectric barrier discharge plasma actuator.

Referring to FIG. 1, solid state dielectric barrier discharge ("DBD") plasma actuator 100 comprises surface electrode 102, dielectric barrier 104 and an electrode below the dielectric barrier, referred to as a buried electrode 106. In some embodiments, exposed electrodes 102 may be flush with dielectric barrier 104. In other embodiments, exposed electrodes 102 may protrude from dielectric barrier 104. An AC or pulsed power supply 108 is used to apply a voltage to the electrodes. A control module 110 may be used and may be a separate unit or it may be part of the power supply 108.

A jet of plasma is generated as ions move from surface electrode 102 toward buried electrode 106. These ions collide with neutral air molecules entraining additional flow. Two surface electrodes 102 may be located on either side of buried electrode 106. As the plasma flows from surface electrodes 102 toward buried electrode 106, the plasma jets may collide, causing plasma jet 112 to protrude normal to the surface.

Figure 2:
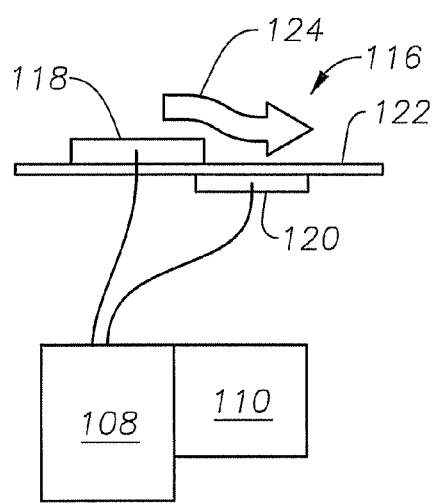
FIG. 2 is a block diagram of another exemplary embodiment of a dielectric barrier plasma actuator.

Referring to FIG. 2, in an alternative embodiment, each plasma actuator 116 comprises a single surface electrode 118 for each buried electrode 120. Surface electrode 118 is located on top of dielectric barrier 122. Surface electrode 118 may be flush with dielectric barrier 122, or may protrude from dielectric barrier 122. Buried electrode 120 is buried below dielectric barrier 122. Dielectric barrier 122 forms a surface for the underlying member such as, for example, a portion of a jet nozzle (not shown). In this embodiment, plasma 124 flows from surface electrode 118 toward buried electrode 120, thus creating a small jet 124 of flow that is nominally parallel to the wall or surface.

Figure 3:
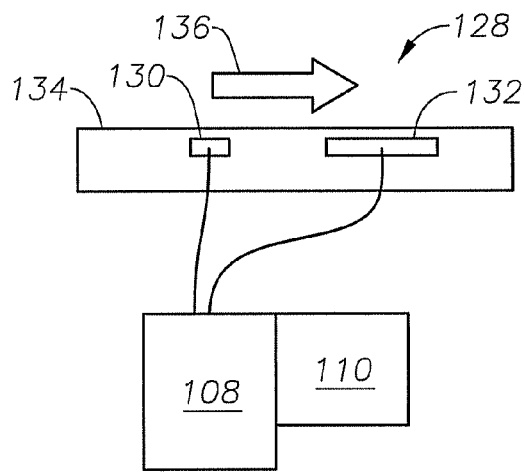
FIG. 3 is a block diagram of yet another exemplary embodiment of a dielectric barrier plasma actuator.

Referring to FIG. 3, in yet another alternative embodiment, each plasma actuator 128 comprises two buried electrodes, a narrow electrode 130, and a wide electrode 132, wherein each buried electrode is encapsulated in dielectric material 134. When energized, ions flow from the narrow electrode toward the wide electrode, causing a force on the local flow near the surface acting in the direction toward the wide electrode.

DBD plasma flow control works through application of high voltage across suitably arranged electrodes to ionize air molecules. The electric field then imparts an electrohyrdodynamic body force to the ions which then travel from one electrode toward the other. Momentum is transferred from these ions to neutral air molecules through collisions, resulting in local flow acceleration. In regions of high receptivity, this can produce a deflection of flow or induce or prevent flow separation.

Various types of power supply 108 may be used. In some embodiments, the power supply produces superposition of DC offsets and AC voltages. Other embodiments may produce pulsed power output, including short pulses such as nanosecond pulses. The wave form of the output could be sinusoidal, or a variation of a sinusoidal (such as sawtooth, square wave, etc) output may be used to generate the desired optimum plasma generation and jet formation for a given electrode configuration.

Figure 4:
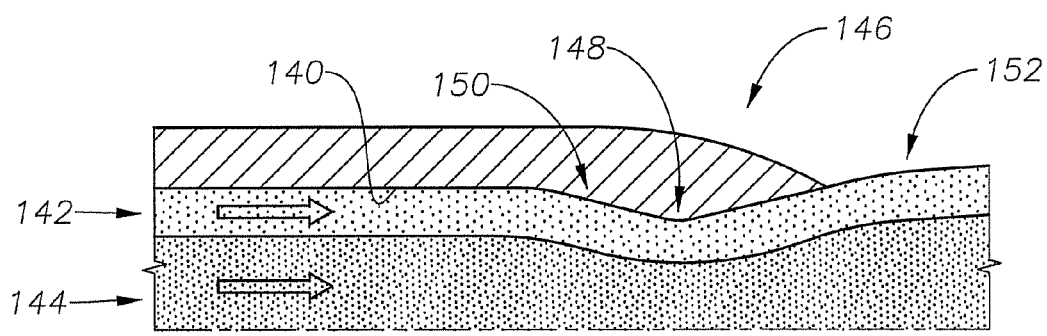
FIG. 4 is a cross sectional view of gas flow through a convergent-divergent nozzle.

Referring to FIG. 4, exhaust system surfaces 140 are often cooled by introduction of a layer of cooling air 142 near surface 140 to form a protective film between hot, core air 144 and surface 140. In the case of a turbofan engine a portion (fan flow) of the air entering the engine bypasses the engine core (high pressure compressor, combustor, and turbine) and becomes the source of cooling air 142. Cooling air 142 gradually mixes with hot air 144 or is swept off the surface by secondary flows, resulting in increased nozzle wall temperature and hot streaks.

Plasma flow control may be used to reduce undesirable secondary flows or to control the behavior of air in a cooling film so that the film remains intact and effective over a greater distance. Thermal gradients (hot streaks) along the exhaust system surfaces may be alleviated by the ability to control the distribution of cooling air 142 as well. This ability to manipulate the behavior of the flow near the nozzle surface, or wall, 140 can reduce cooling flow requirements and therefore reduce engine performance penalty. The plasma flow control system can be actively controlled to provide enhanced cooling effectiveness at operating conditions when it is needed and can be "turned off" at more benign operating conditions for reduced engine performance penalty.

Referring to FIG. 4, a jet engine may be equipped with a convergent-divergent nozzle 146. Alternately, nozzle 146 may be only convergent (not shown). A cross-section of jet nozzle 146 may be any shape including, for example, cylindrical, rectangular, or trapezoidal. If the layer of cool flow introduced at the mixing station does not remain effective (due to mixing with hot flow) over the entire length of the nozzle, additional cooling flow must be introduced. In this case a portion of the cooling flow (fan flow in the case of turbofan engines) is ducted behind the nozzle wall to locations requiring the introduction of additional cooling air.

Referring to FIG. 4, in an exemplary embodiment, a convergent-divergent nozzle ("CDN") 146 has a core flow of hot exhaust 144 coming from a combustion chamber on a jet engine (not shown). CDN 146 also has a flow of cooler air 142 coming from a turbo fan (not shown) and bypassing the combustion chamber of the jet engine. The nozzle is shaped to converge towards a throat 148, wherein throat 148 has the smallest cross-sectional flow area of the nozzle assembly 146. As the exhaust flow departs throat 148, the shape of nozzle 146 diverges. A cross-section of jet nozzle may be any shape including, for example, cylindrical, rectangular, or trapezoidal.

Cooler air 142 may be used to cool surfaces in jet nozzle 146. In convergent region 150, exhaust flow may be stable enough for cool air to maintain a protective layer. As cool air and core flow move through nozzle 146, however, the hot and cool exhaust flow mix, resulting in warm exhaust flow. The warm exhaust flow may be too hot for surfaces within nozzle 146, such as the nozzle wall of divergent region 152.

Figure 5:
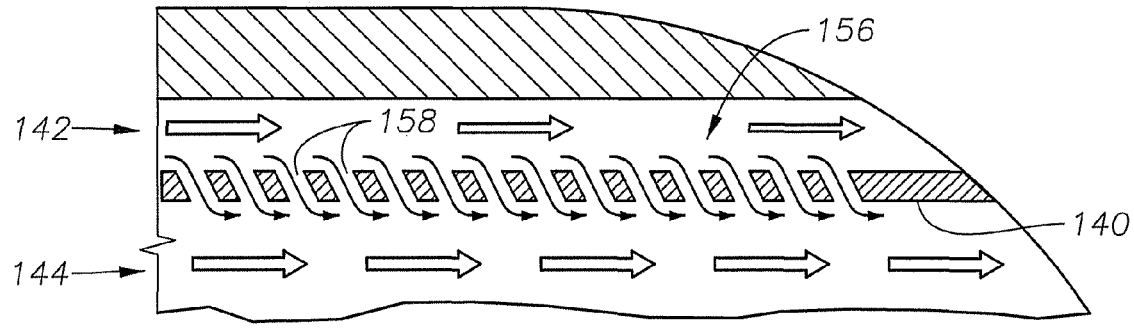
FIG. 5 is a cross sectional view of a jet engine nozzle wall having slots or holes for cooling flow.
Figure 6:
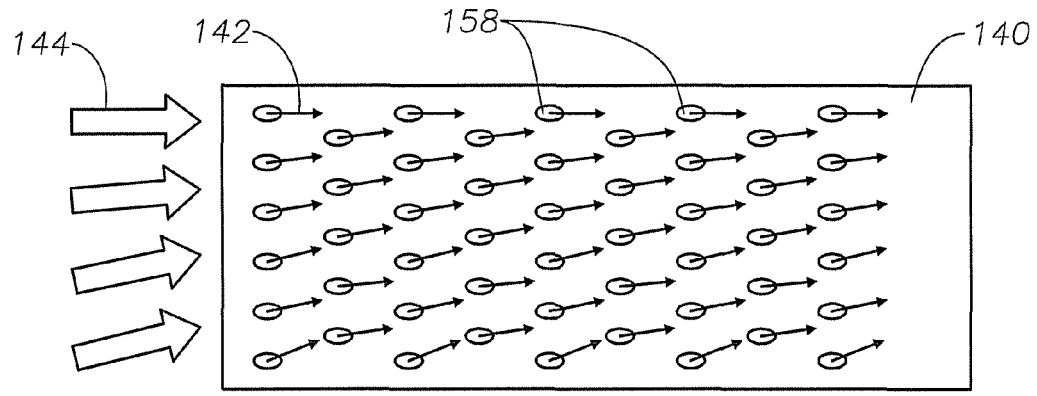
FIG. 6 is a side view of the jet engine nozzle cooled surface of FIG. 5.

Referring to FIG. 5, duct 156 flows cooling air 142 from the fan to a region behind nozzle wall 140. Slots or holes 158 are orifices in nozzle wall 140 that pass cooling air 142 through nozzle wall 140. The cooling air 142 forms a cooling barrier between the hot exhaust flow 144 and nozzle wall 140. FIG. 6 shows a side view of nozzle wall 140 wherein nozzle wall 140 has holes 158 for passing cooling air 142 through nozzle wall 140. The small arrows illustrate how distorted flow (due to exhaust gas swirl, for example) can cause cooling air to migrate away from certain regions, resulting in hot streaks on nozzle wall 140.

Figure 7:
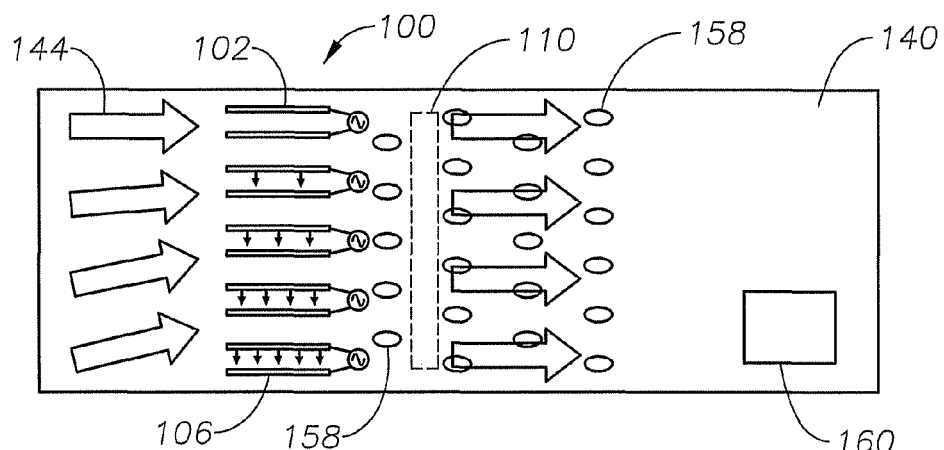
FIG. 7 is a side view of an exemplary embodiment of a jet engine nozzle surface having plasma actuators to manipulate cooling flow.

Referring to FIG. 7, plasma actuators such as plasma actuators 100, 116, 128 may be used to generate plasma to tailor the flowfield near the nozzle wall 140 to improve the cooling film integrity and thus reduce cooling film disruption. The hot streaks associated with cooling film disruption are more intense at high power settings (such as during takeoff or when employing afterburning). DBD plasma actuators 100 are shown for illustrative purposes, but any of the DBD Plasma Actuator types may be used. DBD Plasma Actuators may be spaced apart around the interior of the duct formed by nozzle wall 140. DBD Plasma Actuators may be activated individually or in groups to manipulate the fluid flow across nozzle wall 140. The fluid flow can be tailored, for example, to direct cool air flow from holes 158 in a particular direction and thus maintain the integrity of the cool air film across nozzle wall 140. DBD Plasma Actuators may be activated during these periods when hot streaks are unacceptably severe and turned off at other times. In some embodiments, electrodes 102 can be activated independently and with varying strength to correct local distortions in the flowfield. Improved cooling film integrity may reduce the number of cooling holes 158 required to provide adequate cooling of the surface. Furthermore, the total volume of cooling flow may be reduced when plasma flow control is used to manage cooling flow.

Monitor or sensor 160 may be used to determine which individual DBD Plasma Actuators within an array of DBD Plasma Actuators should be energized to provide optimal cooling. Thermal monitors, for example, may measure the temperature of surface 140 during operation. Pressure sensors may detect exhaust pressure at various locations on surface 140. Control module 110 may receive data from monitors 160 and then adjust power to each of the electrodes 102 or to groups of electrodes until the optimal flow conditions are created for the current jet engine and flight condition parameters. Experiments using various sensors 160 may be performed in advance to establish optimal electrode configurations and to determine which electrodes 102 or groups of electrodes should be energized for optimal cooling under each of various engine and flight conditions. Unique actuation profiles may be created, for example, for after-burner flight at specific altitudes, for takeoffs, and for landings. A control module 110 may select the appropriate profile responsive to flight conditions, real-time data from sensors, or a combination thereof.

Figure 8:
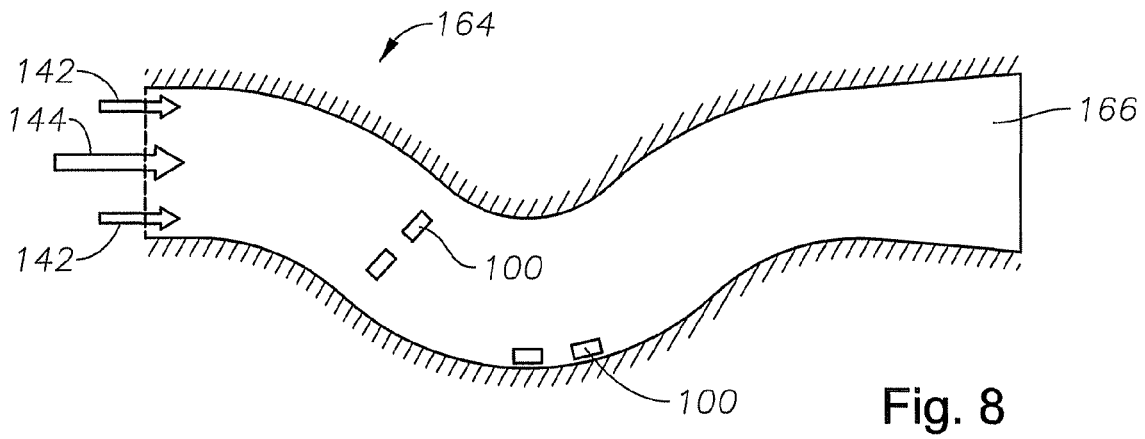
FIG. 8 is a cross sectional view of a serpentine nozzle for a jet engine.

Referring to FIG. 8, jet exhaust is directed into serpentine nozzle 164. In the case of a turbofan engine, this exhaust flow will consist of a central region of hot flow (core flow) 144 which has come through the engine core, surrounded by a region of cooler flow (fan flow) 142 which has come through the low pressure compression system (fan) of the engine. Serpentine nozzle 164 is an elongated nozzle that may have multiple bends between the jet engine (not shown) and the exit 166 of serpentine nozzle 164. One or more DBD Plasma Actuators, such as plasma actuators 100, 116, or 128, may be placed on the surface of serpentine nozzle 164.

Figure 9:
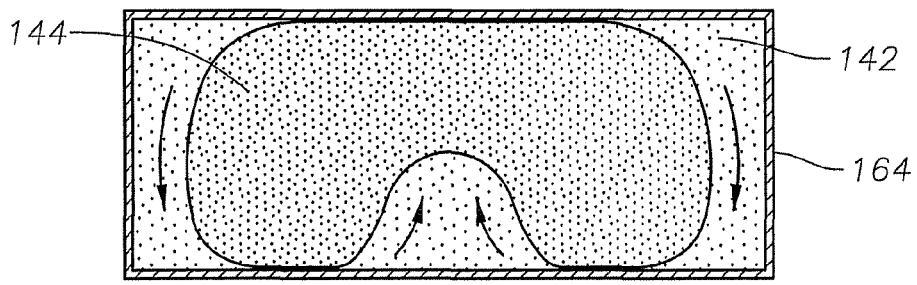
FIG. 9 is a sectional view of the serpentine nozzle of FIG. 6.

Referring to FIG. 9, the cross section of serpentine nozzle 164 may be rectangular or may be another shape such as round, elliptical, trapezoidal, or any other shape. At the discharge of the turbofan engine, core flow is completely surrounded by fan flow. Thus a layer of fan flow 142 forms a protective barrier between hot flow 144 and serpentine nozzle 164 surfaces. The turns in nozzle 164 create secondary rotational flows that cause cool air near the surface to rotate in toward the center of the duct, leaving hot flow in contact with the surface. As core flow 144 and fan flow 142 move through serpentine nozzle 164, the changes in direction in the nozzle may cause hot streaks wherein core flow 144 mixes with or passes through cooling air 142 and ultimately contacts serpentine nozzle 164 wall.

Figure 10:
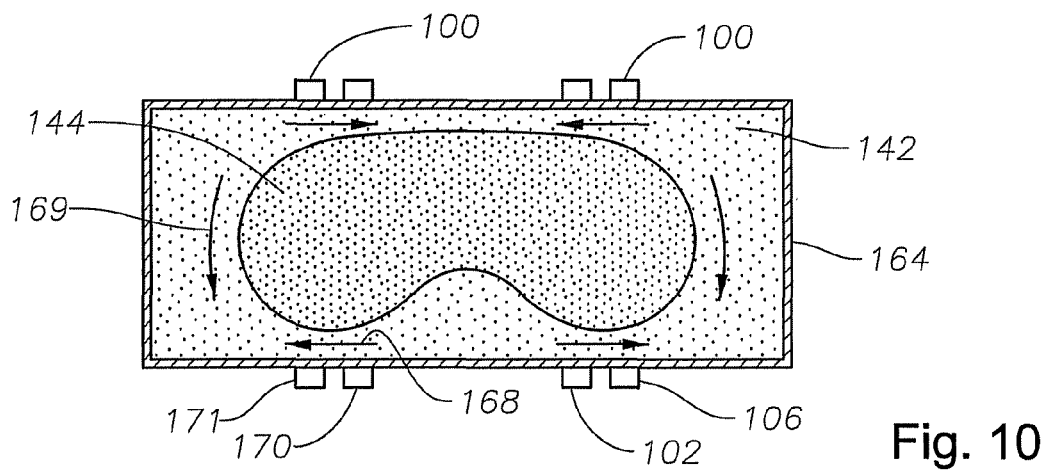
FIG. 10 is a sectional view of an exemplary embodiment of plasma actuator electrodes located in the serpentine nozzle of FIG. 8.

Referring to FIG. 10, DBD Plasma Actuators, such as plasma actuators 100, 116, or 128, may be placed on surfaces within serpentine nozzle 164. The one or more DBD Plasma Actuators such as plasma actuators 100, 116, 128 may generate a dielectric barrier discharge ("DBD") plasma to manipulate the exhaust flow. Flow induced by the plasma actuators may counteract duct secondary flow. The DBD plasma actuators may be used, for example, to cause cool fan flow 142 near the surface to flow in a direction 168 opposite the rotation of the secondary flow. In an exemplary embodiment, to counter a counter-clockwise rotational flow 169, surface electrode 170 is placed to the right of buried electrode 171. Control module 110 (FIG. 1) applies power from power supply 108 (FIG. 1) to surface electrode 170 and buried electrode 171. A plasma jet flows from surface electrode 170 toward buried electrode 171. The plasma jet creates a force 168 in a clockwise direction to block or reduce the counter-clockwise flow 169 of cool fan flow 142. An array of multiple DBD Plasma Actuators may be used, in which case control module 110 may sequentially apply power to electrodes in a manner to optimize counter-rotational flow. The same counter-rotational flow techniques may be used to alter any cooling air 142 flow within serpentine nozzle 164 or other nozzles requiring manipulation of cool air barriers.

Referring to FIG. 11, jet exhaust 172 exits nozzle 146 at high velocity, where the exhaust 172 encounters low velocity freestream air 174. Much of the noise associated with jet engines is created by fluidic shear stress at the boundary 176 (shear, or mixing, layer) between jet exhaust 172 and freestream air 174. Noise can be diminished by rapidly mixing the exhaust 172 and the freestream air 174, thus spreading the velocity gradient over a larger mixing layer 176. The use of physical tabs or chevrons to reduce noise is described in NASA TM-2003-212335.

Referring to FIG. 12, DBD plasma electrodes 102, 106 may be placed near the exit of the jet nozzle 146. Referring to FIG. 1, in an exemplary embodiment, a plasma jet 112 is created by two surface electrodes 102 located on either side of a buried electrode 106. Two plasma jets flow towards the buried electrode 106 and collide to create a flow "fountain" of plasma 112 essentially normal to the surface. Plasma jet 112 (FIG. 1) acts analogously to a physical tab to create vortices which enhance turbulent mixing of the exhaust plume and freestream near the nozzle exit. Increasing the turbulence near the exit reduces the turbulence further downstream. Because this downstream turbulence is a source of low frequency noise (which often dominates jet noise), reducing the turbulence in this area reduces low frequency noise (see NASA TM-2003-212335). The DBD Plasma Actuators such as plasma actuators 100, 116, 128 may operate with a variety of input power waveforms to produce near steady or pulsed actuation. Pulsed or unsteady actuation may be employed at frequencies which optimize noise reduction. Operation in pulsed mode at appropriate frequencies may shift turbulent energy from low modes to higher modes, which may also reduce noise (see NASA TM-2003-212335).

Control module 110 (FIG. 1) may be used to adjust power to electrodes 102 or to groups of electrodes 102. A sound sensor (not shown) may provide acoustic intensity and frequency data to the control module 110 so that the control module can adjust plasma discharge to achieve optimal noise reduction. In some embodiments, a sound sensor may be used to create actuation profiles for each of various flight conditions. The profiles may be stored on a machine readable medium and accessed by the control module 110. The control module 110 can select from the profiles responsive to flight conditions rather than requiring data from a sound sensor during flight. In some embodiments, the control module may use both stored profiles and a sound sensor.

Referring to FIG. 13, under ideal conditions, the exhaust plume 184 pressure at exit plane 186 of jet exhaust nozzle 146 is equal to ambient pressure. Under some conditions, however, exhaust flow 184 may be over-expanded, a condition wherein exhaust flow 184 expands to lower than ambient pressure before reaching the exit plane. This condition may occur when the aircraft is operating in off-design conditions, such as a high speed aircraft operating at low speed during takeoff and landing.

Referring to FIG. 14, a plurality of DBD Plasma Actuators, such as plasma actuators 100, 116, 128, may be spaced apart around the interior of nozzle 146 and used to cause flow 190 to separate from the wall of the nozzle 146 at a point 192 earlier than the flow would normally separate. The pressure within the flow 190 is higher at the early separation point 192 than the pressure would be without flow control. Thus the plasma actuators create a virtual exit plane, upstream of the physical exit plane, with a reduced effective expansion area ratio such that flow expansion is nearer ideal. Control module 110 (FIG. 1) may optimize the location of the virtual exit plane by selectively energizing specific DBD Plasma Actuators. In an exemplary embodiment, forward plasma actuator 194 is located closer to throat 148 than rearward plasma actuator 196. Control module 110 may energize either plasma actuator 194, 196, alternate between them at some frequency, or energize no plasma actuator at all, to achieve near ambient exhaust pressure at the virtual exit plane.

Figure 15:
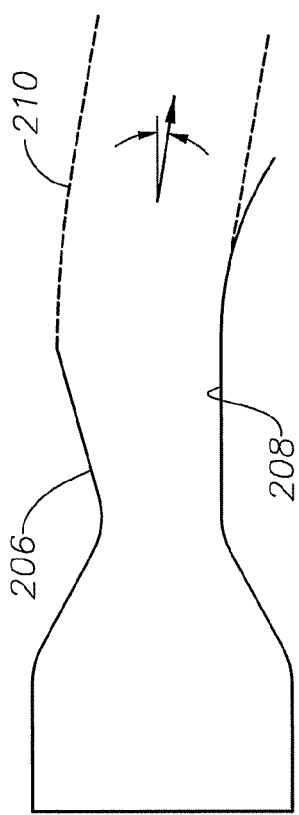
FIG. 15 is a side view of an exemplary embodiment of plasma flow control changing the thrust vector angle in a jet engine nozzle.

Referring back to FIG. 13, a jet exhaust flow 184 typically exits nozzle 146 in an axial direction. The pressure on the opposite sidewalls of the nozzle 146 is roughly equal, causing the exhaust flow to exit in an axial direction and therefore creating axial thrust. Referring to FIG. 15, DBD plasma actuators may be used to direct jet exhaust 198 in a non-axial direction. DBD Plasma Actuators, such as plasma actuators 100, 116, 128 can be controlled to produce a force opposing the exhaust flow near the nozzle surface on one side of the exhaust nozzle 146. The opposing force locally reduces or reverses flow velocity and produces a blockage 200 within the nozzle 146. The local blockage turns flow away from the wall, resulting in a change in thrust vector angle. In an exemplary embodiment, DBD thrust vectoring can be activated and deactivated as needed to control nozzle thrust vector angle.

In an exemplary embodiment, the DBD Plasma Actuators, such as plasma actuators 100, 116, or 128, used to create thrust vectoring (FIG. 15) are the same plasma actuators used to alter the point of flow separation in a jet nozzle (FIG. 14). In this embodiment, the different applications are created by the power supply and control module 110 (FIG. 1). For example, the controller 110 may symmetrically apply power to all plasma actuators such as plasma actuators 100, 116, 128 around the circumference of the nozzle during off-design conditions to alter the point of flow separation. Controller 110 may apply power to electrodes asymmetrically to create thrust vectoring. Furthermore, all or a portion of plasma actuators such as plasma actuators 100, 116, 128 used for flow separation and thrust vectoring may be the same plasma actuators used to reduce noise from a jet engine nozzle (FIG. 12).

Figure 16:
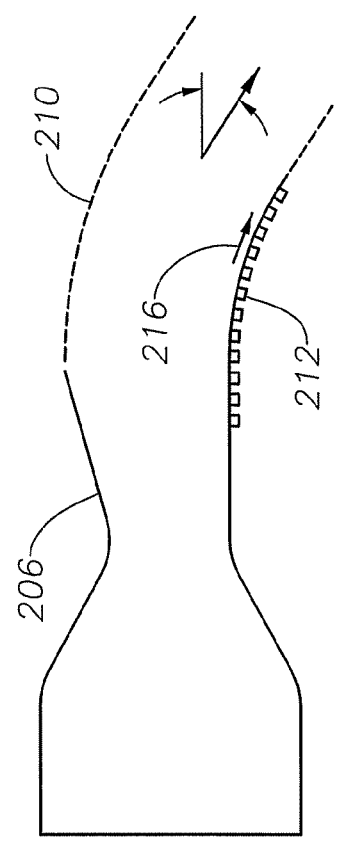
FIG. 16 is a cross sectional view of a jet engine nozzle having an extended surface to which the exhaust flow may attach or separate, resulting in variation of thrust vector angle with separation location.

Referring to FIG. 16, a jet nozzle 206 may have a non-symmetrical shape such as an extended surface 208 on one side of the nozzle. Similarly, the extended surface 208 may be part of the aftbody or wing of the aircraft (not shown) such as, for example, on an aircraft wherein the jet exhaust is located above a wing surface. The irregular shape causes the exhaust plume to flow in a non-axial direction and thus create a non-axial thrust vector. The exhaust plume 210 may separate from the extended surface 208 at a location which varies with the nozzle pressure ratio, velocity of the aircraft, etc. Thus the direction of the thrust vector may vary depending on conditions.

Figure 17:
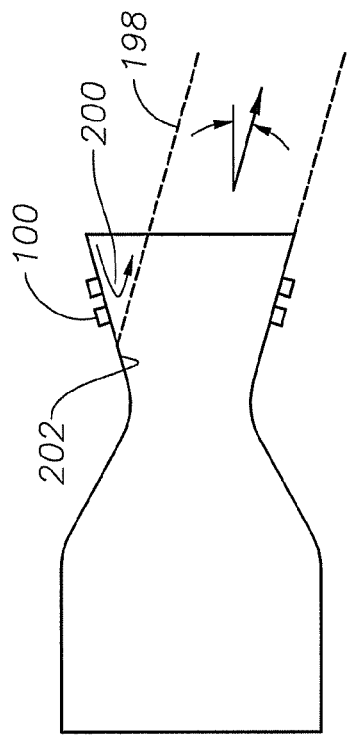
FIG. 17 is a cross sectional view of an exemplary embodiment of plasma flow control causing separation to occur further upstream on the extended surface and changing the vector angle of the exhaust flow from the jet engine nozzle of FIG. 16.

Referring to FIG. 17, plasma array 212 may be installed on the extended surface 208. In an exemplary embodiment, plasma array 212 is a series of electrodes having alternating surface and buried electrodes. Plasma may be generated from an aft surface electrode towards an adjacent forward buried electrode, thus creating a plasma jet that generally moves aft to fore. Alternatively, plasma may be generated from a forward surface electrode to the adjacent aft buried electrode, thus creating a plasma jet that generally moves fore to aft.

Referring to FIG. 17, DBD plasma is generated on the extended surface 208 of an extended-surface jet nozzle, the plasma flowing aft to fore. The array of plasma devices 212 produces a force 214 opposing the exhaust flow near the wall 208, locally reducing or reversing flow velocity and producing a local blockage. Thus the opposing force 214 causes the flow to separate prematurely—changing the thrust vector angle. FIG. 17 shows an embodiment where premature separation is used to change the exhaust flow thrust vector to a more axial direction. A control module (not shown) may be used to direct power to various electrodes and to vary the strength of the power to each electrode to change the thrust vector to the desired direction.

Figure 18:
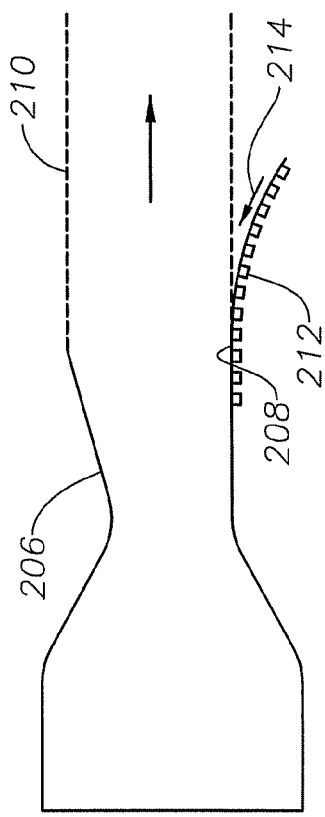
FIG. 18 is a cross sectional view of an exemplary embodiment of plasma flow control delaying flow separation on the extended surface and changing the thrust vector angle of the exhaust flow of the jet engine nozzle of FIG. 16.

Referring to FIG. 18, DBD plasma array 212 is used to create a fore-to-aft, or downstream, acting force 216 on flow near the surface of the extended surface 208 of nozzle 206. The local flow acceleration delays separation and thus changes the thrust vector angle to a more extreme angle than would occur without the downstream acting, DBD plasma force. Plasma array 212 used to create the downstream acting force 216 may be the same plasma array 212 used to create the upstream acting force 214 (FIG. 17). The only difference being the manner in which the electrodes are energized by the power supply 108 (FIG. 1) and control module 110 (FIG. 1). FIG. 18 shows an embodiment where extended attachment is used change the exhaust flow thrust vector to an increased off-axial direction such as would be desired for a blown flap.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. One or more elements of the exemplary embodiments may be combined, in whole or in part, with one or more elements of one or more of the other exemplary embodiments. Many variations and modifications are possible and are within the scope of the invention. Accordingly, the scope of protection is not limited to the embodiments described, but is only limited by the claims that follow, the scope of which shall include all equivalents of the subject matter of the claims.

We claim:

1. An apparatus for manipulating exhaust flow in an aircraft jet exhaust nozzle, the apparatus comprising:
   a solid state dielectric barrier discharge (DBD) plasma actuator adapted to be mounted to the aircraft in the vicinity of the jet exhaust and having first and second electrodes separated by a dielectric barrier such that when supplied with power, a plasma discharge develops between the electrodes that alters a direction of a portion of the exhaust; and wherein the first electrode is exposed to the exhaust and the second electrode is insulated from the exhaust with the dielectric barrier.

2. The apparatus according to claim 1, wherein the plasma discharge alters the direction of cooling air flow in the exhaust stream via an electrohydrodynamic effect.

3. The apparatus according to claim 1, the apparatus further comprising a plurality of the first and second electrodes spaced around a circumference of the nozzle; and
   a controller adapted to selectively supply power to a portion of the first electrodes and a portion of the second electrodes.

4. The apparatus according to claim 1, further comprising a sensor for monitoring cooling air flow, wherein the controller supplies power to a selected portion of first electrodes and second electrodes to achieve optimal cooling flow responsive to the sensor for monitoring the cooling flow.

5. The apparatus according to claim 1, wherein the nozzle has at least one curved portion along its length and the first and second electrodes are positioned along the curved portion.

6. The apparatus according to claim 1, wherein the first and second electrodes are located near an exit of the nozzle and are adapted to promote mixing between the exhaust and free stream air.

7. The apparatus according to claim 1, wherein a plurality of the first and second electrodes are spaced around the circumference of the nozzle at a location between a throat and an exit of the nozzle and are adapted to cause exhaust flow to separate from a surface of the nozzle.

8. The apparatus according to claim 7, further comprising a controller, wherein the controller selectively applies power to portions of the plurality of first and second electrodes to cause the flow to separate from the surface of the nozzle prior to a point where expansion has caused the exhaust pressure to be lower than the pressure outside the nozzle.

9. The apparatus according to claim 1, wherein the first and second electrodes are located on an irregularly shaped nozzle and are adapted to produce plasma from an aft end of the nozzle toward a fore end of the nozzle.

10. The apparatus according to claim 1, wherein the direction of the exhaust flow exiting the nozzle is changed by application of power to the first and second electrodes.

11. The apparatus according to claim 1, wherein the nozzle comprises an extended aft surface, and wherein the first and second electrodes are located on the extended aft surface to alter the direction of the exhaust flow.

12. An aircraft jet exhaust nozzle, comprising:
    a duct located aft of an engine for directing exhaust from the engine;
    a solid state dielectric barrier discharge (DBD) plasma actuator adapted to be mounted to the aircraft in the vicinity of the duct and having first and second electrodes separated by a dielectric barrier such that when supplied with power, a plasma discharge develops between the electrodes that alters a direction of a portion of the exhaust; and wherein the first electrode is exposed to the exhaust and the second electrode is insulated from the exhaust with the dielectric barrier.

13. The apparatus according to claim 12 further comprising an orifice through the duct for flowing cooling air, wherein the plasma discharge alters a direction of the cooling air.

14. The apparatus according to claim 12, wherein the nozzle has at least one curved portion along its length and the first and second electrodes are positioned along the curved portion.

15. A method for manipulating exhaust flow, the method comprising:
    (a) placing a solid state dielectric barrier discharge ("DBD") plasma actuator on an exhaust nozzle, the DBD plasma actuator having a first electrode separated from a second electrode by a dielectric barrier, wherein the first electrode is exposed to the exhaust and the second electrode is insulated from the exhaust with the dielectric barrier;
    (b) discharging a fluid through the exhaust nozzle;
    (c) applying power to the first and second electrodes to create dielectric discharge barrier plasma between the first and second electrodes; and
    (d) creating an electrohydrodynamic effect with the plasma to change a direction of at least a portion of the fluid.

16. The method according to claim 15, wherein step (a) comprises placing a plurality of the DBD plasma actuators circumferentially around the nozzle and supplying power selectively to the DBD plasma actuators to change a cross-sectional shape of the exhaust.

17. The method according to claim 15, wherein step (b) comprises discharging an engine exhaust and flowing a cooling air flow through the nozzle, and wherein step (d) comprises changing the direction of at least a portion of the cooling air flow.

18. The method according to claim 15, the DBD plasma actuator is located on an extended aft surface of the exhaust nozzle, wherein exhaust from the jet engine contacts the extended aft surface and wherein plasma from the DBD plasma actuator alters the flow of the exhaust.

19. The method according to claim 15, wherein the DBD plasma actuator is located to the aft of a throat section of the exhaust nozzle and forward of an outlet of the exhaust nozzle.

20. The apparatus according to claim 15, wherein the nozzle has at least one curved portion along its length and the DBD plasma actuator is positioned along the curved portion.

* * * * *